United States Patent
Fechner et al.

(10) Patent No.: US 8,239,085 B2
(45) Date of Patent: Aug. 7, 2012

(54) METHOD FOR DETECTING ROAD LANE MARKINGS

(75) Inventors: Thomas Fechner, Kressbronn (DE); Stefan Heinrich, Achern (DE); Dirk Ulbricht, Achern (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 1175 days.

(21) Appl. No.: 12/067,477

(22) PCT Filed: May 20, 2006

(86) PCT No.: PCT/DE2006/000871
§ 371 (c)(1), (2), (4) Date: Mar. 20, 2008

(87) PCT Pub. No.: WO2007/033627
PCT Pub. Date: Mar. 29, 2007

(65) Prior Publication Data
US 2008/0255724 A1 Oct. 16, 2008

(30) Foreign Application Priority Data
Sep. 20, 2005 (DE) .................. 10 2005 044 979

(51) Int. Cl.
B60W 30/12 (2006.01)
G05D 1/02 (2006.01)

(52) U.S. Cl. .......... 701/28; 701/300; 382/104; 382/181

(58) Field of Classification Search .......... 701/28, 701/23, 223, 41, 42, 43, 44, 207, 205, 300; 340/905, 901; 382/103, 104, 181; B60W 30/12; G05D 1/02
See application file for complete search history.

(56) References Cited

U.S. PATENT DOCUMENTS

| | | | | |
|---|---|---|---|---|
| 5,555,555 A * | 9/1996 | Sato et al. | .................. | 382/104 |
| 5,617,085 A * | 4/1997 | Tsutsumi et al. | ............. | 340/903 |
| 5,987,174 A * | 11/1999 | Nakamura et al. | ............. | 382/199 |
| 6,053,268 A * | 4/2000 | Yamada | .................. | 180/167 |
| 6,813,370 B1 * | 11/2004 | Arai | .................. | 382/104 |
| 6,819,779 B1 * | 11/2004 | Nichani | .................. | 382/104 |
| 6,879,706 B2 * | 4/2005 | Satoh et al. | .................. | 382/104 |
| 6,925,206 B2 * | 8/2005 | Akutagawa | .................. | 382/173 |
| 7,209,832 B2 * | 4/2007 | Yamamoto et al. | ............. | 701/301 |
| 7,218,207 B2 * | 5/2007 | Iwano | .................. | 340/435 |
| 7,808,523 B2 * | 10/2010 | Nishida et al. | .................. | 348/148 |
| 7,937,196 B2 * | 5/2011 | Watanabe et al. | .................. | 701/23 |
| 2003/0016287 A1 * | 1/2003 | Nakayama et al. | .................. | 348/148 |
| 2004/0062418 A1 * | 4/2004 | Ishikura et al. | .................. | 382/104 |
| 2005/0256636 A1 * | 11/2005 | Miyashita et al. | ............. | 701/207 |
| 2007/0107965 A1 | 5/2007 | Kakinami et al. | | |

FOREIGN PATENT DOCUMENTS

| | | |
|---|---|---|
| DE | 699 04 056 T2 | 2/2000 |
| DE | 10327869 | 1/2005 |
| DE | 102004003502 | 11/2005 |
| JP | 08320997 | 3/1996 |
| JP | 2004310522 | 4/2004 |

* cited by examiner

Primary Examiner — Paul N Dickson
Assistant Examiner — Keith Frisby

(57) ABSTRACT

A method for detecting road lane markings for a motor vehicle in motion with an image recording unit is presented. The image recording unit points to the road in front of the vehicle and in the recorded image data, brightness differences (contrasts) are analysed and/or edges are extracted. Road lane markings are detected by means of their periodic arrangement. For evaluation purposes, the measuring signal of the image recording unit is transformed into another coordinate system, and the auxiliary function thus obtained is tested for periodic structures.

14 Claims, 2 Drawing Sheets

METHOD FOR DETECTING ROAD LANE MARKINGS

This application is the U.S. national phase of international application PCT/DE2006/000871 filed May 20, 2006, which designated the U.S. and which claims the benefit of priority of German Patent Application Number 10 2005 044 979.4 filed Sep. 20, 2005. The contents of each of the aforementioned documents are incorporated herein in their entirety.

BACKGROUND OF THE INVENTION

The invention relates to a method and a device for detecting road lanes. An important component of driver assistance systems which for example are used to regulate interim distance or to keep the vehicle in lane is the prediction of the road lane. Different approaches are offered as solutions in publications. DE 10327869 discloses a navigation system with road lane information in which road map data is stored with road lane information in a storage element and in addition, the road in front of the vehicle is recorded. The data records are compared in order to determine the position and the road lane of the vehicle.

As an alternative, camera systems are frequently used for the purpose of finding the road lane. For example, in DE 102004003502, a method and a device for assisting the guidance of a motor vehicle are presented. The vehicle environment is recorded with a camera. In order to evaluate the image data, specified search windows are used in which the road markings are detected. The maximum number of available search windows is determined subject to the situation. This method offers the advantage that a road lane can continue to be detected even when driving around corners or changing lane.

An object of the present invention is to detect the road lane of a motor vehicle in a rapid and reliable manner.

SUMMARY OF THE INVENTION

The object is attained by a method and device for detecting road lane markings (5) for a motor vehicle (1) in motion with an image recording unit. The method obtains image data from an image recording unit (6), wherein the image recording unit (6) points to the road (3) in front of the vehicle; the image data is analyzed for at least one of contrasts or edges that are extracted; and road lane markings (5) are detected by means of a periodic arrangement on the road (3), wherein for evaluation purposes, the measurement signal from the image recording unit (6) is transformed into another coordinate system, and the auxiliary function thus obtained is tested for periodicity.

For a camera-based road lane detection of a vehicle, the image data is analysed with an evaluation method (algorithm) suitable for the purpose. For a rapid and reliable detection of the road lane, it is advantageous that the type of marking is known. For example, in Germany, a white line which is interrupted at periodic intervals is preferred as a road lane marking, while in the USA, dot-shaped, raised lane markings, known as Bog Dots, can be found. If the type of road lane marking is known which currently restricts the lane of the vehicle, a targeted search can be made in the image data for the presence of objects with a specified form and at a specified distance.

For this purpose, a method for detecting road lane markings for a motor vehicle in motion with an image recording unit is provided. The image recording unit points to the road in front of the vehicle. The recorded image data is analysed for brightness differences (contrasts) and/or edges are extracted in the image. Road markings are characterized by their periodic arrangement on the road. In the image, a 3-dimensional scene from the vehicle environment is depicted in a two-dimensional manner. In other words, objects in the surrounding environment are not necessarily also shown as being also equidistant in the image. For this reason, for evaluation purposes, the image data is first transformed into another coordinate system which compensates the perspectively distorted depiction of the environment described. This auxiliary function is tested for periodically recurring objects. Preferably, depending on the direction of view and the depiction properties of the image recording unit, an auxiliary function with spatially equidistant measuring points is interpolated in the vehicle environment or on the road.

In a preferred embodiment of the invention, the calculated or interpolated auxiliary function is tested for periodic brightness changes per route unit. Below, in a similar manner to the term "frequency" which relates to temporal changes, the term "spatial frequency" will be used to describe spatially varying values. The spatial frequency spectrum is compared with previously stored frequency samples of typical road markings. Here it is in some cases advantageous only to compare relevant frequency ranges. By means of the accordance with one of the specified frequency samples, the type of road marking (interrupted line, Bot Dots etc.) is detected.

In a further embodiment of the invention, the auxiliary function of the brightness progression is evaluated in a temporal period. With the aid of correlation methods, a search can be made for the specific signatures of typical types of markings. For this purpose, the image data or the time-dependent auxiliary signal is correlated with a specified signal progression which is typical for a certain type of marking, i.e. either a convolution of the two signals or a cross correlation is conducted. On the basis of the result, the similarity of the two signals is determined, and a decision can thus be made as to whether or not the marking is of the specified type. In the evaluation, the intrinsic speed of the vehicle must be included, since the determined frequency depends on the speed, and thus only signal progressions can be compared which are determined at similar speeds. The correlation method provides a normed result, whereas the result of a convolution is not normed, and thus an adaptive decision method as to whether the marking is of the specified type must be provided.

A road lane marking detection method which uses correlation of the measured brightness progression with a progression which is typical for a type of marking is conducted in a specific embodiment of the invention in an entirely similar manner to the method described above, but in the spatial range rather than in the temporal period. In an advantageous embodiment of the invention, a search is made for contrast differences and thus for road markings in specified areas of the image. The specified areas are arranged in such a manner that they restrict the lane progression which is assumed in the model.

Further stages in the method for testing the obtained result and for avoiding evaluation errors are described in the following advantageous embodiments of the invention. Road markings which are erroneously detected make it difficult to detect road lanes. "Erroneously detected road markings" may arise as a result of dirt, textures or reflective images of the road markings, e.g. on a wet road in the image section in question.

In a particular embodiment of the invention, in the image for individual segments (image sections) respectively along the identified road lane markings, a frequency spectrum of the brightness progression is determined. The frequency spectrum is determined by means of a frequency analysis of the time-dependent brightness progression for one image segment or image point. The frequency spectra of the different image segments are compared. If in one image segment the frequency spectrum deviates significantly from that of the other segments, the measuring signal in this segment is discarded.

In an advantageous embodiment of the invention, in the image for individual segments (image sections or image pixels) respectively along the identified road lane markings, a brightness progression is determined. Marking lines are usually represented by periodic structures in the direction of travel. Alongside the spatial periodicity, a temporal periodicity of the marking measurement values also arises while driving. Due to the temporal change between marking measurement and marking gaps, the same brightness progression is produced in all image segments. As a result of the comparison of the brightness progressions by means of cross correlation, the similarity of the brightness progressions can be determined. If the brightness progression in one specific image segment does not correlate with the other brightness progressions, it is discarded.

In a further embodiment of the invention, in order to identify evaluation errors, the time-dependent brightness progression in the individual image segments is compared with specified brightness values, taking into account the intrinsic speed. The measured signal and the specified signal can only be compared with each other when both are recorded or simulated at the same vehicle speed. The comparison is conducted by means of correlation or frequency analysis, with a subsequent comparison of the spectra. Both evaluation methods have been described directly above. The specified brightness progressions correspond to those of typical road lane markings. If the recorded brightness progression in one image segment shows no similarity with one of the specified brightness progressions, this measuring signal is discarded.

In an advantageous embodiment of the invention, in order to avoid evaluation errors, only objects are detected as road markings which are arranged along a straight line or a curve. This arrangement corresponds to the typical progression of road lane markings.

The direction of movement of the objects detected as road markings is in a particular embodiment of the invention tested in images which are recorded in succession. The direction of movement of "real" road lane markings corresponds essentially with an at least approximately straight progression of the road or in the immediate area in front of the vehicle. Measurement values of objects which significantly deviate from the direction of movement of other markings are discarded.

In an advantageous embodiment of the invention, the direction of movement and/or the movement speed of the objects detected as road markings are tested in images which are recorded in succession and are compared with an anticipated progression. The anticipated progression is determined subject to the intrinsic speed of the vehicle and in some cases by the type of marking (interrupted line, Bot Dots etc.). Objects which deviate from this anticipated progression are discarded.

In addition, a device with an image recording unit and a control unit with stored programming for implementing a method as described above is presented. Reference data relating to known road lane markings and programming in order to implement one of the methods described above are stored on the control unit.

The invention will now be described in greater detail with reference to an exemplary embodiment and 2 drawings, in which:

DETAILED DESCRIPTION OF THE DRAWINGS

Figure 1:
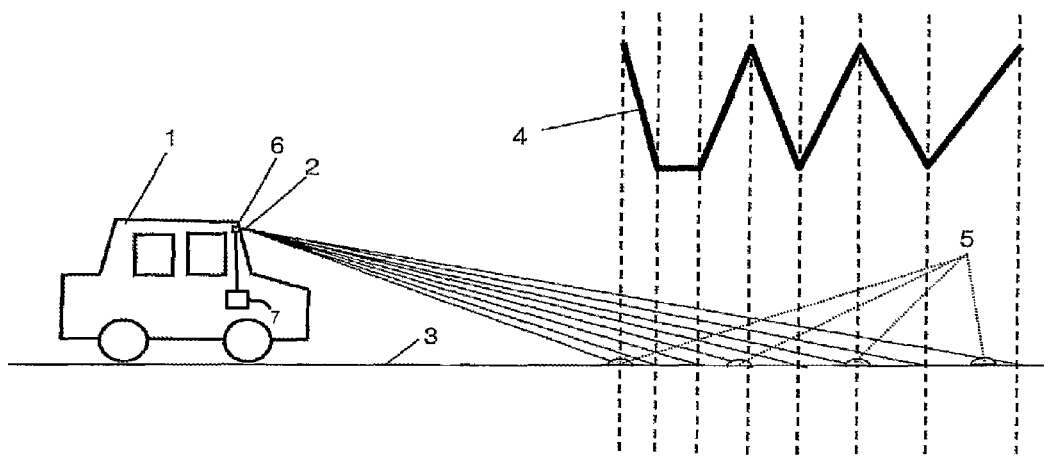
FIG. 1 shows the sensing of the road by the image lines of a camera

FIG. 1 illustrates a method and a device for implementing the method of detecting road lane markings (5) for a motor vehicle (1) in motion with an image recording unit (6). The method obtains image from an image recording unit (6), wherein the image recording unit (6) points to the road (3) in front of the vehicle. A control unit (7) for the motor vehicle (1) obtains the image data from the image recording unit (6), and analyzes the image. The image data is analyzed for at least one of contrasts or edges that are extracted. Road lane markings (5) are detected by means of a periodic arrangement on the road (3). For evaluation purposes, the measurement signal from the image recording unit (6) is transformed into another coordinate system, and the auxiliary function thus obtained is tested for periodicity.

The method shown for detecting road lanes specifically uses the periodic properties of road lane markings. Periodic properties can be particularly advantageously tested following a transformation of the signal into the frequency range. The term "frequency" is here to be understood in the abstract sense, however, since the signal of the markings repeats itself not with time, but with the journey completed. In this case, the term used is "spatial frequency" rather than the frequency which relates to time. In order to use standard methods of transformation into the frequency range, a spatially equidistant sensing of the measuring signal is required. A direct spatially equidistant sensing of the road is not possible with a camera image, since digital images consist of pixels which are arranged at an equal distance on the image chip. The projection of the pixels onto the road does not however lead to an equidistant sensing of the road, since generally, the image recorder does not point directly onto the road.

This is also shown in FIG. 1. An image recorder is arranged in a motor vehicle 1 in such a manner that a scene on the road 3 in front of the motor vehicle 1 is recorded. The lines 2 which are arranged in a fan-like manner show the projection of the lines of the image chip on the road 3. The intervals between adjacent intersections with the road increase as the distances increases. The road 3 is thus not sensed in an equidistant manner. The progression shown as a thick black line in the image results for the progression of the image brightness for a contrast equivalent auxiliary function 4 in the range of the edge of the road lane. In order to obtain a spatially equidistantly sensed signal, a further auxiliary function with equidistant and discrete signal values must be interpolated.

This auxiliary signal is tested for spectral components.
Continuous lines constitute a high constant component
Interrupted lines constitute a low constant component and a low-frequency spectral component, and
Dotted lines constitute a comparatively higher-frequency spectral component Each type of marking 5 thus constitutes a characteristic frequency spectrum which is used in the method described here for identifying road lane markings. The advantage of this method for road lane detection is that with an image recorder, a large projection range is evaluated, and thus, more rapid results can be obtained than e.g. with signal evaluation with only one radiation receiver.

Figure 2:
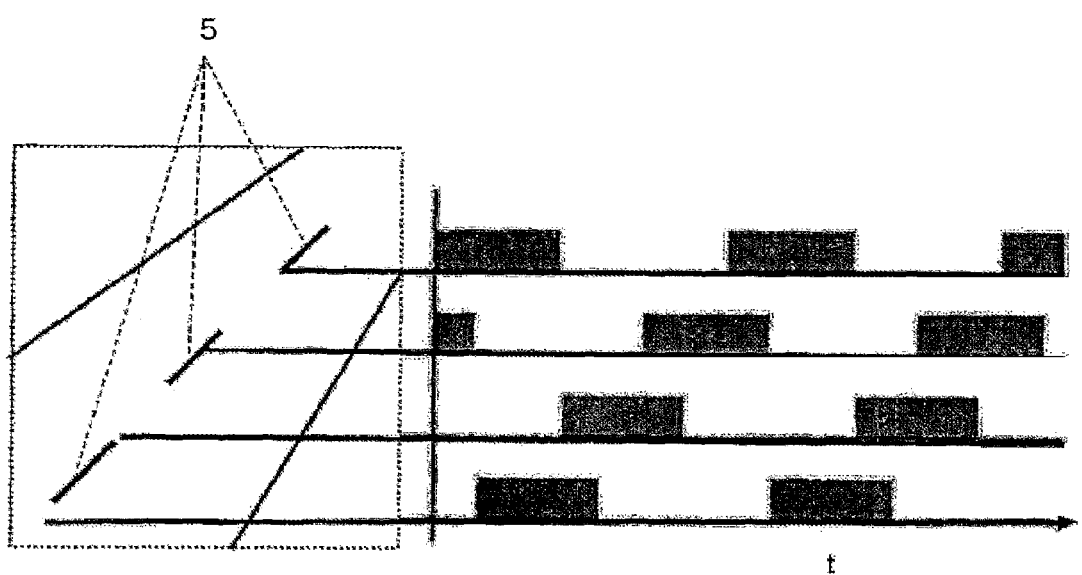
FIG. 2 shows the time progression of road lane markings

In order to avoid evaluation errors when detecting the road lane, in addition to the method described above, the temporal periodicity of road lane restriction lines is tested. Marking lines (5) are usually represented by periodic structures in the direction of travel. Alongside the spatial periodicity, a temporal periodicity of the marking measurement values also occurs while driving, however. It is shown in FIG. 2 that the repetition frequency with which road markings in the image segments are detected along the road lane edge is independent of the distance between the road lane marking and the vehicle. For this purpose, the temporal progression of the measuring signal at specific image points is shown on the right hand side in FIG. 2. If the repetition frequency therefore deviates significantly in one image segment from the repetition frequency determined in other image segments, the measuring signal in this image segment is discarded.

The invention claimed is:

1. A method for detecting road lane markings (5) for a motor vehicle (1) in motion with an image recording unit, the method comprising:
obtaining image data from an image recording unit (6), wherein the image recording unit (6) points to the road (3) in front of the vehicle;
analyzing the image data for at least one of contrasts or edges that are extracted;
detecting road lane markings (5) by means of a periodic arrangement on the road (3), wherein for evaluation purposes, a measurement signal from the image recording unit (6) having a first coordinate system is transformed into another coordinate system, and an auxiliary function thus obtained is tested for periodicity.

2. The method according to claim 1, wherein depending on a direction of view of the image recording unit (6), the auxiliary function with spatially equidistant measuring points is interpolated on the road.

3. The method according to claim 1, wherein the auxiliary function is tested for periodic brightness changes per route unit, and is characterized by means of the spatial frequency.

4. The method according to claim 1, wherein the image data or the auxiliary function is tested in temporal period by means of correlation with a specified signal or frequency analysis for specific signatures of the specified marking types, wherein the intrinsic speed of the motor vehicle is taken into account.

5. The method according to claim 1, wherein the auxiliary function in the spatial area is tested by means of a cross correlation or a convolution with a specified signal for specific signatures of the specified marking types.

6. The method according to claim 1, wherein a search is made for road markings (5) only in the specified areas of the image.

7. The method according to claim 1, wherein in order to identify evaluation errors in the image for individual segments (image sections) respectively along the identified road lane markings (5), a frequency spectrum of the temporal brightness progression is determined, and
the values are compared with each other; and
with a significant deviation of the frequency in one segment, this measuring signal is discarded.

8. The method according to claim 7, wherein in order to identify evaluation errors in the image for individual segments (image sections) respectively along the identified road lane marking (5), a brightness progression is determined, comparisons are made with the other brightness progressions by means of correlation, and with a significant deviation in a segment, this measuring signal is discarded.

9. The method according to claim 8, wherein in order to identify evaluation errors, the brightness progressions are compared for individual image segments respectively, taking into account the intrinsic speed, with specified brightness progressions which correspond to those of typical road lane markings, by means of correlation and frequency analysis, wherein with a significant deviation of the brightness value in a segment from all specified signals, the measuring signal is discarded.

10. The method according to claim 1, wherein in order to identify evaluation errors, only those objects are detected as road markings (5) which are arranged along a straight line or a curve.

11. The method according to claim 1, wherein a direction of movement of the objects in the image detected as the road marking (5) is analysed, wherein measurement values of objects which deviate from the direction of movement of other markings are discarded.

12. The method according to claim 1, wherein at least one of a direction of movement and a movement speed of the objects in the image which are detected as the road marking (5) are tested and are compared with a predicated progression, wherein the predicated progression depends on the intrinsic speed of the device, and objects which deviate from this progression are discarded.

13. A device comprising:
an image recording unit; and
a control unit, wherein the control unit obtains image data from the image recording unit (6), analyzes the image data for at least one of contrasts or edges that are extracted, and detects road lane markings (5) by means of a periodic arrangement on the road (3), wherein for evaluation purposes, a measurement signal from the image recording unit (6) having a first coordinate system is transformed into another coordinate system, and an auxiliary function thus obtained is tested for periodicity.

14. A motor vehicle having a device according to claim 13.

* * * * *